US009170084B2

(12) United States Patent
Honda et al.

(10) Patent No.: US 9,170,084 B2
(45) Date of Patent: Oct. 27, 2015

(54) SURFACE TEXTURE MEASURING MACHINE AND A SURFACE TEXTURE MEASURING METHOD

(71) Applicant: MITUTOYO CORPORATION, Kanagawa (JP)

(72) Inventors: Hiroomi Honda, Miyazaki (JP); Shingo Kuroki, Miyasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 342 days.

(21) Appl. No.: 13/780,705

(22) Filed: Feb. 28, 2013

(65) Prior Publication Data

US 2013/0239668 A1 Sep. 19, 2013

(30) Foreign Application Priority Data

Mar. 19, 2012 (JP) ................. 2012-062746

(51) Int. Cl.
*G01B 5/28* (2006.01)
*G01B 21/04* (2006.01)
*G01B 5/20* (2006.01)

(52) U.S. Cl.
CPC .. *G01B 5/28* (2013.01); *G01B 5/20* (2013.01); *G01B 21/047* (2013.01)

(58) Field of Classification Search
CPC ........... G01B 5/20; G01B 5/28; G01B 21/047
See application file for complete search history.

(56) References Cited

U.S. PATENT DOCUMENTS 6,745,616 B1 * 6/2004 Katayama et al. .............. 73/104
2007/0266781 A1 11/2007 Nemoto et al.

FOREIGN PATENT DOCUMENTS

| JP | 2000-227327 | 8/2000 |
| JP | 2001-133247 | 5/2001 |
| WO | 95/25940 | 9/1995 |

OTHER PUBLICATIONS

EPO Search Report dated Jul. 4, 2013.
U.S. Appl. No. 13/781,934 to Toshihiro Kanematsu et al., which was filed on Mar. 1, 2013.

* cited by examiner

*Primary Examiner* — Daniel S Larkin
(74) *Attorney, Agent, or Firm* — Greenblum & Bernstein, P.L.C.

(57) ABSTRACT

A surface texture measuring method includes: moving a stylus toward an origin point; and, when the stylus reaches the origin point, braking the stylus to be stopped after overrunning the origin point waiting for a measurement start command (approach section setting operation); bringing the stopped stylus into contact with a target portion of the workpiece (workpiece setting operation); moving the stopped stylus in a measurement direction reverse to the overrunning (approach operation); and, when the stylus passes the origin point in the approach operation, continuing the movement of the stylus while acquiring data detected by the detector (measurement operation).

4 Claims, 11 Drawing Sheets

SURFACE TEXTURE MEASURING MACHINE AND A SURFACE TEXTURE MEASURING METHOD

The entire disclosure of Japanese Patent Applications No. 2012-062746 filed Mar. 19, 2012 is expressly incorporated by reference herein.

BACKGROUND OF THE INVENTION

1. Field of the Invention

The present invention relates to a surface texture measuring machine and a surface texture measuring method. More specifically, it relates to a surface texture measuring machine and a surface texture measuring method for measuring a narrow area in which a mechanical movement is restricted.

2. Description of Related Art

A surface texture measuring machine for measuring a surface texture (e.g. surface roughness, waviness and profile) and a surface texture measuring method using the surface texture measuring machine have been conventionally known (see Patent Literature 1: JP-A-2000-227327 and Patent Literature 2: JP-A-2001-133247).

The surface texture measuring machine measures a surface texture of a workpiece by tracing a surface of the workpiece with a stylus. Specifically, the stylus is brought into contact with a desired point on the surface of the workpiece and is moved in a predetermined measurement direction along the surface of the workpiece while being in contact with the surface of the workpiece. In accordance with the movement, the stylus displaces in a direction intersecting the tracing direction in accordance with the irregularities on the surface of the workpiece. The displacement is recorded in conjunction with the movement in the tracing direction, whereby the surface texture of the workpiece can be measured.

The surface texture measuring machine includes a drive mechanism for moving the stylus. The drive mechanism typically includes a guide rail that supports an arm provided with the stylus at an end thereof in a manner capable of linear movement, a ball screw shaft disposed along a rail, and a drive source such as an electric motor to rotate the ball screw shaft to feed the arm.

Such a drive mechanism inevitably causes a backlash in the ball screw shaft and the like.

In view of the above, an approach section is set at the start of the tracing operation in some of the surface texture measuring machines.

The approach section is a predetermined distance or time period in which the stylus is simply moved (i.e. without measuring) after starting the tracing operation.

After elapsing or passing the approach section, the surface texture measuring machine performs a movement accompanying a normal measurement operation, i.e. the detection of the displacement of the stylus and data processing.

With the presence of the approach section, the backlash of the drive mechanism is eliminated in the subsequent measurement operation, thereby maintaining appropriate relationship between the movement position and the displacement during the measurement operation.

The above-described approach section is typically defined as an approach distance of approximately 0.5 mm. Specifically, an output of an encoder for detecting the movement position is monitored and the approach section is counted as a pulse number of the encoder corresponding to the above approach distance.

No specific limitation has been posed for setting the approach section, but the approach section has been set with a margin sufficient for eliminating the backlash of the drive mechanism and stabilizing the measurement operation.

Incidentally, the above-described surface texture measuring machine is used not only for measuring a surface texture of a continuous surface of a workpiece but also for measuring a narrow area on a workpiece (e.g. a gap between two projections and bottom surface of a groove).

Such a narrow area sometimes is approximately 1 mm in width. In order to measure such a narrow area, the stylus can be miniaturized to ensure the movement area over the entire inner width of the groove and the like.

However, when the above-described approach section is 0.5 mm, only 50% of the bottom surface of the groove of 1 mm width can be measured.

When the approach section is changed to be set short, the distance available for the measurement can be increased.

However, the short approach section accompanies the following disadvantages.

Firstly, since there is no reference value for changing the approach section to be short, repetitive tests are required.

Further, all the measurement operations are conducted with the short approach section. Thus, when an area other than the narrow area is to be measured, adjustment operation for, for instance, changing back to the typical approach section with a margin is required.

SUMMARY OF THE INVENTION

An object of the invention is to provide a surface texture measuring machine and a surface texture measuring method that are capable of providing a sufficient measurement distance for measuring a narrow area and simplifying operations before and after measuring a narrow area.

In the invention, an origin point detection function inherent to a surface texture measuring machine is utilized to use a distance of an overrun due to inertia when a stylus is stopped at an origin point as an approach section and a series of operations for using the overrun as the approach section are set as a special operation mode of the surface texture measuring machine, whereby a narrow area can be easily and securely measured with the use of the special operation mode.

A surface texture measuring machine according to an aspect of the invention measures a surface texture of a workpiece by tracing a surface of the workpiece with a stylus, the surface texture measuring machine including: a drive mechanism that moves the stylus; a detector that detects a displacement of the stylus; and a controller that controls the drive mechanism and the detector, in which the controller is operated in a normal measurement mode in which a designated range of the surface of the workpiece is measured and in a narrow-area measurement mode in which a narrow area of the workpiece is measured, in the narrow-area measurement mode, the controller commands the drive mechanism and the detector to perform: an approach section setting operation that is started by designating the narrow-area measurement mode, in which the stylus is moved toward an origin point and, when the stylus reaches the origin point, the stylus is braked to be stopped after overrunning the origin point and is in wait for a measurement start command; an approach operation that is started by the measurement start command, in which the stopped stylus is moved in a measurement direction reverse to a direction of the overrunning; and a measurement operation in which the stylus continues moving while acquiring data detected by the detector when the stylus passes the origin point as a result of the approach operation.

In the above aspect of the invention, when the normal measurement mode is selected, the controller controls the drive mechanism and the detector to perform the same operation as those in conventional operations by designating the manual movement operation of the stylus, start and stop of the measurement operation and the like. On the other hand, when a narrow area of a workpiece is to be measured, the narrow-area measurement mode is selected to perform respective operations for measurement in the narrow-area measurement mode according to the above aspect of the invention.

Initially, the approach section setting operation is performed while keeping the stylus from contacting the workpiece.

Thus, the stylus stops while being overrun to a side opposite to a side relative to the origin point in which the measurement operation is to be conducted.

In this state, the workpiece is brought into contact with the workpiece and tracing start command is inputted.

Thus, the stylus is moved by the drive mechanism and, after moving in the approach section corresponding to the overrun, the stylus continues movement thereof accompanying data processing (measurement operation) after passing the origin point.

In the narrow-area measurement mode, the backlash of the stylus and the drive mechanism is gathered on one side in the approach section for the overrun that is set by the approach section setting operation. The movement from the approach section is continued in the subsequent measurement operation, so that the influence of the backlash can be eliminated.

In the narrow-area measurement mode of the above aspect of the invention, since the approach section is set with the use of the overrun after passing the origin point during the origin return operation, the distance of the approach section can be set small. Though depending on the speed of the origin return operation when the origin return speed is 2 mm/sec, for instance, the overrun is approximately 70 μm and approximately 7 μm when the origin return speed is 0.5 mm/sec, so that the approach section can be considerably reduced as compared with the conventional distance of approximately 0.5 mm.

As a result, when a bottom section of a groove of, for instance, 1 mm in width is to be measured, while the distance conventionally available for the measurement is 0.5 mm (50% of the total width), the distance available for the measurement is 0.93 mm with the overrun of 70 μm and 0.993 mm with 7 μm overrun, so that substantially the entire width is available for the measurement.

The narrow-area measurement mode can be set with a simple operation, i.e. selecting the narrow-area measurement mode on the surface texture measuring machine, setting the workpiece and commanding the measurement operation. Further, as described above, the surface texture measuring machine of the above aspect of the invention can perform the conventional measurement operation when the normal measurement mode is selected.

In the above aspect of the invention, it is preferable that, in the approach section setting operation: the stylus is moved toward the origin point at the first speed; when the stylus reaches the origin point, the stylus is braked to be stopped with the stylus overrunning the origin point; after switching a movement direction of the stylus, the stylus is moved toward the origin point; when the stylus reaches the origin point, the stylus is braked to be stopped with the stylus overrunning the origin point; the stylus is moved toward the origin point at a second speed lower than the first speed; and when the stylus reaches the origin point, the stylus is braked to be stopped with the stylus overrunning the origin point and is in wait for the measurement start command.

According to the above arrangement, since the stylus is moved at the high first speed until passing the origin point for the first time, the operation time can be reduced. Further, after the second passing of the origin point, the first and the last (third) origin return operations can be directed in the same direction. In addition, since the last passing of the origin point is conducted at the low second speed, the overrun can be shortened, thereby reducing the approach section and ensuring longer distance for the measurement operation.

In the above arrangement, since the respective operations are switched only by detecting the passing of the origin point, it is not necessary to set a predetermined point for decelerating or suspending at a point before reaching the origin point or to provide a position sensor to constantly monitor the movement position of the stylus. Accordingly, though as many as three operation switching are necessary, the structure and control of the machine can be simplified, so that the facility cost can be reduced and serviceability can be enhanced.

In the above aspect of the invention, it is preferable that in the approach section setting operation: after the stylus is moved toward the origin point at the first speed, the stylus is decelerated when reaching a deceleration point at a predetermined distance before reaching the origin point; the stylus is moved toward the origin point at a second speed lower than the first speed; and, when the stylus reaches the origin point, the stylus is braked to be stopped with the stylus overrunning the origin point and is in wait for the measurement start command.

When switching between the first and second speeds, the stylus may be stopped at a predetermined point before reaching the origin point or may be switched by changing (decelerating) the speed when passing a predetermined point before reaching the origin point.

In order to decelerate from or stop at the predetermined point before reaching the origin point, a position sensor may be disposed along the movement path to detect that the stylus has reached the predetermined position, or a current-position counter of the controller may be monitored to detect that the stylus has reached the predetermined point.

According to the above arrangement, since the stylus is moved at the high first speed before reaching the origin point, the operation time can be reduced. In addition, since the passing of the origin point is conducted at the low second speed, the overrun can be shortened, thereby reducing the approach section and ensuring longer distance for the measurement operation.

Further, since the original movement direction at the start of the movement toward the origin point is continued until the overrunning during the approach section setting operation, complicated operations for reversing the direction and the like are not necessary and the movement can be efficiently conducted.

The predetermined point at which the first speed is switched to the second speed is preferably adjusted based on the relationship between the operation speeds. When the predetermined point is remote from the origin point, the low-speed movement has to be performed for a long time, thereby increasing the operation time. On the other hand, when the predetermined point is excessively close to the origin point, the stylus is not sufficiently decelerated to the low speed until the stylus passes the origin point, so that the overrun, i.e. the approach section, cannot be sufficiently shortened. Thus, it is preferable that an appropriate value is set in view of the above conditions.

A surface texture measuring method according to another aspect of the invention is for measuring a surface texture of a workpiece by tracing a surface of the workpiece with a stylus, the surface texture measuring method including: using a surface texture measuring machine comprising: a drive mechanism that moves the stylus; a detector that detects a displacement of the stylus; and a controller that controls the drive mechanism and the detector; setting an approach section, in which the stylus is moved toward an origin point and, when the stylus reaches the origin point, the stylus is braked to be stopped after overrunning the origin point and is in wait for measurement start command; bringing the stopped stylus into contact with a target portion of the workpiece; approaching, in which the stopped stylus is moved in a measurement direction reverse to a direction of the overrunning; and continuing the movement of the stylus while acquiring data detected by the detector when the stylus passes the origin point as a result of the approaching.

The method according to the above aspect of the invention offers the same advantages mentioned in the surface texture measuring machine of the above-described aspect of the invention.

DESCRIPTION OF EMBODIMENT(S)

Exemplary embodiments of the invention will be described below with reference to the drawings.

First Exemplary Embodiment

FIGS. 1 to 7 show a first exemplary embodiment of the invention.

Figure 1:
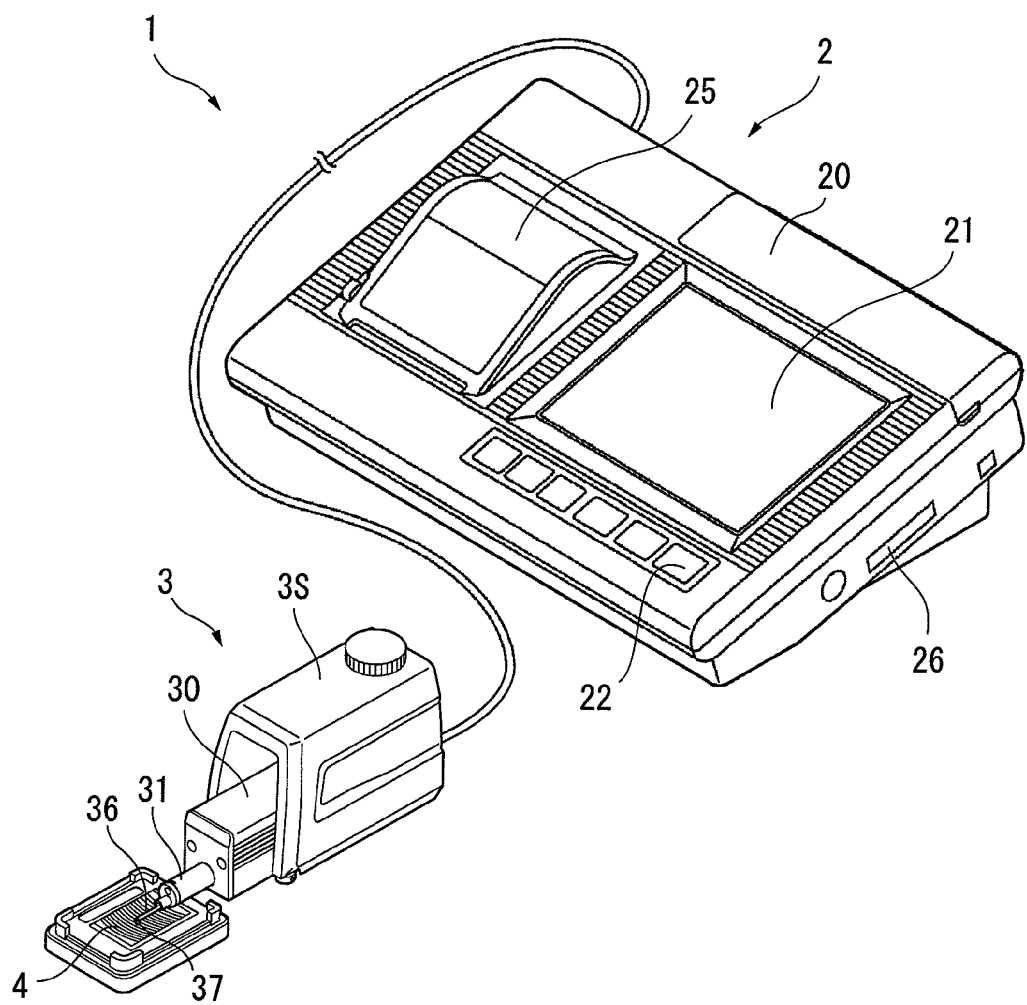
FIG. 1 is a perspective view of a surface texture measuring machine according to a first exemplary embodiment of the invention.
Figure 2:
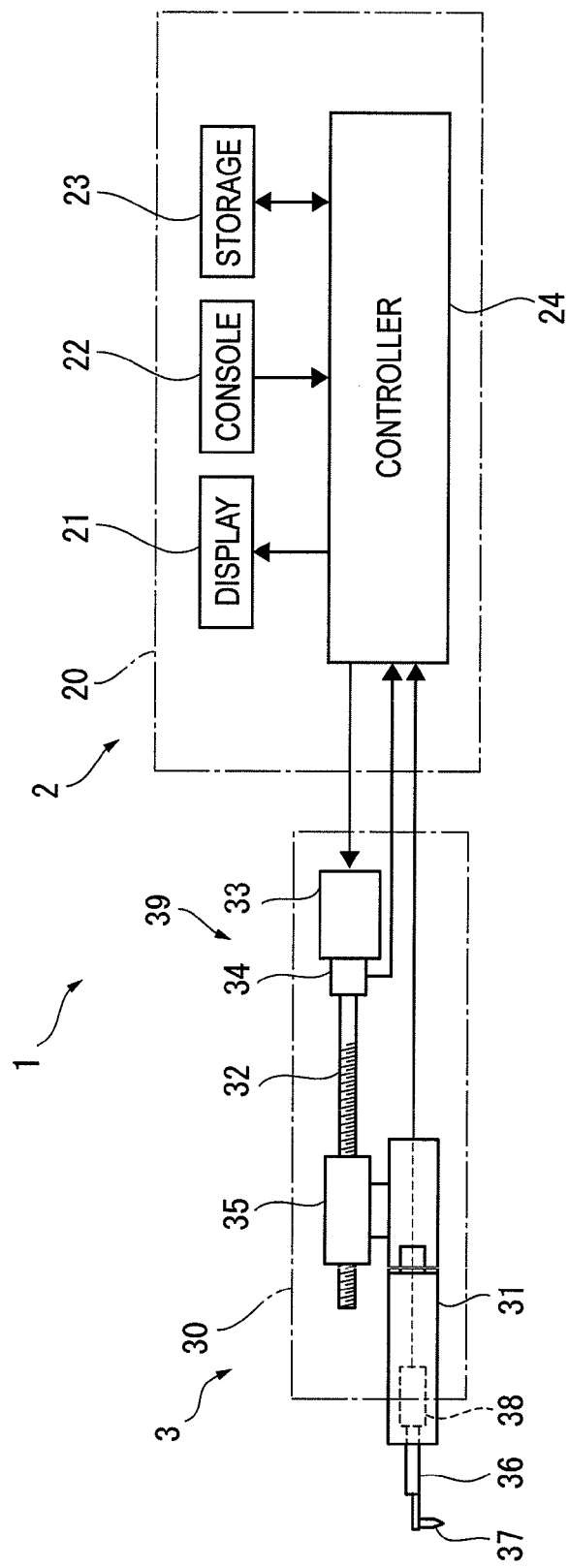
FIG. 2 is a block diagram showing an arrangement of the surface texture measuring machine according to the first exemplary embodiment.
Figure 3:
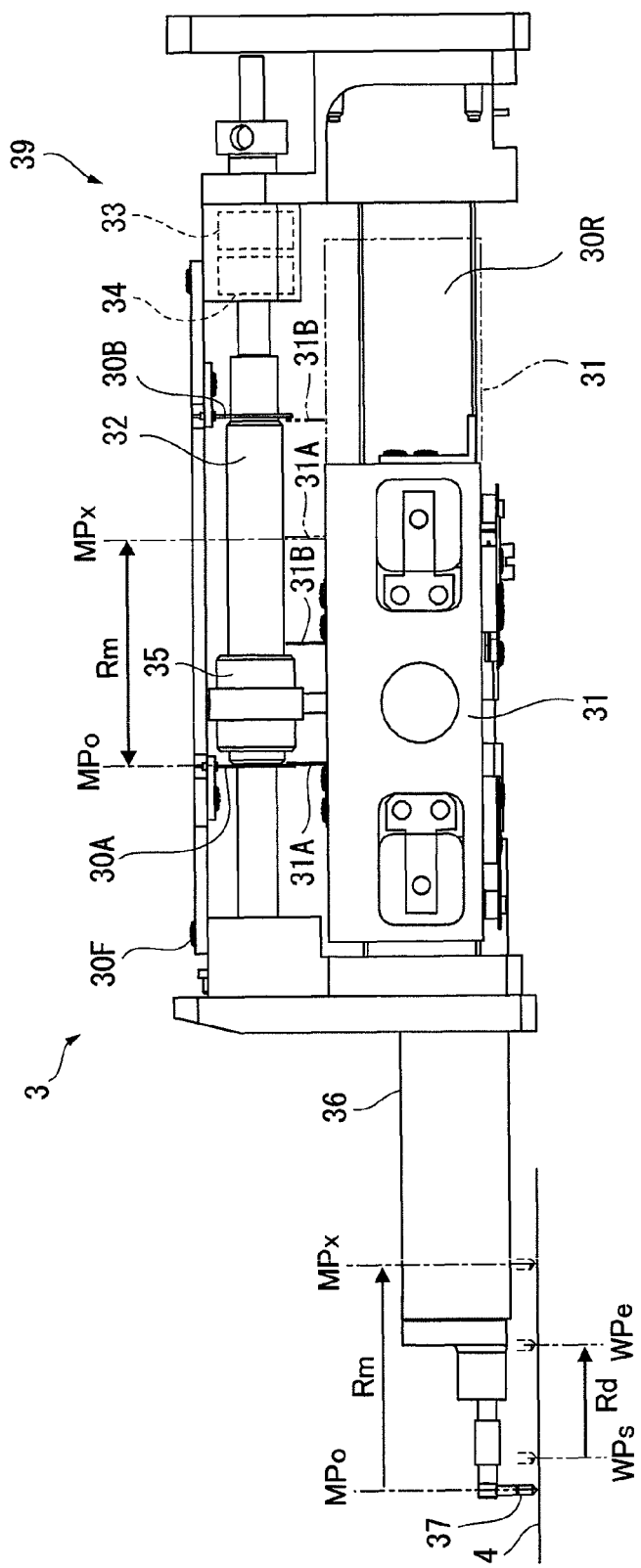
FIG. 3 is a side elevation showing a relevant part of the surface texture measuring machine according to the first exemplary embodiment.

FIGS. 1 to 3 show an arrangement of a surface texture measuring machine according to the first exemplary embodiment.

As shown in FIGS. 1 and 2, the surface texture measuring machine 1 according to the first exemplary embodiment includes an electric portion 2 and a drive/detector unit 3.

The electric portion 2 includes a display 21 such as a touch-panel display and a console 22 such as a sheet switch on a surface of a case 20. The electric portion 2 also includes storage 23 in a form of a storage device and the like, and a controller 24 (controller of the invention) inside the case 20.

The controller 24 is provided by a small computer system. The controller 24 controls respective components of the surface texture measuring machine 1 based on the operational program stored in the storage 23 to perform various processes.

A printer 25 is provided on a front side of the case 20. An I/O terminal 26 is provided on a side of the case 20.

The drive/detector unit 3 includes a movement block 31 in the case 30. The movement block 31 is supported by a guide rail (not shown) in a manner movable in a predetermined movement direction (right and left directions in the figure).

A ball screw shaft 32 is provided in parallel to the movement direction of the movement block 31. The ball screw shaft 32 is rotated by an electric motor 33 (drive source). A rotary angle position of the ball screw shaft 32 is detected by a rotary encoder 34. A ball nut 35 is screwed to the ball screw shaft 32. The ball nut 35 is connected to the movement block 31.

The electric motor 33 and the rotary encoder 34 are connected to the controller 24. The controller 24 controls an operation of the electric motor 33 to rotate the ball screw shaft 32 while monitoring the rotary angle position detected by the rotary encoder 34, thereby allowing the movement of the movement block 31 to a desired point. The ball screw shaft 32, the ball nut 35, the electric motor 33 and the rotary encoder 34 constitute the drive mechanism 39.

An end of the movement block 31 is exposed from a side opening of the case 30. An arm 36 is disposed on the exposed end of the movement block 31 and a stylus 37 is fixed on an end of the arm 36.

The arm 36 extends along the movement direction of the movement block 31 and is pivotally supported on the movement block 31. The pivotal movement of the arm 36 causes vertical displacement (up-down direction in the figure) of the end of the arm 36 and the stylus 37. A detector 38 for detecting a pivotal angle of the arm 36 is provided in the movement block 31. The detector 38 detects the angle of the arm 36 so that the displacement of the stylus 37 can be detected.

As shown in FIG. 1, when the stylus 37 traces the surface of the workpiece 4 and is vertically moved due to the irregularities on the surface, detection signals from the detector 38 is sent to the controller 24 to be processed therein, which is displayed, printed, or recorded as the measurements of the surface texture (e.g. surface roughness, waviness and profile).

It should be noted that the case 30 is supported by a vertical tilting unit 3S in order to adjust the height or inclination of the stylus 37 relative to the workpiece 4.

As shown in FIG. 3, the case 30 of the drive/detector unit 3 includes a frame 30F inside an exterior of the case 30. FIG. 3 shows the drive/detector unit 3 with the exterior of the case 30 being removed.

The drive mechanism 39 including the ball screw shaft 32, the electric motor 33 and the rotary encoder 34 is disposed in the frame 30F. A guide rail 30R is disposed in the frame 30F. The guide rail 30R supports the movement block 31 so that the movement block 31 is movable therealong.

Limit plates 31A and 31B for detecting a movement limit are provided on the movement block 31. Limit switches 30A and 30B that detect a contact with the limit plates 31A and 31B are provided on the frame 30F.

As described above, the movement block 31 is driven by the drive mechanism 39 to be moved along the guide rail 30R.

When the movement block 31 is advanced toward the end (i.e. an end on which the stylus 37 is provided) to reach a movement limit (a functional limit of the ball screw shaft 32), the limit plate 31A is in contact with the limit switch 30A. Then, based on the operational signals of the limit switch 30A, the controller 24 recognizes that the movement block 31 is at an advance-side movement limit and stops further advancement of the drive mechanism 39. A contact point at which the limit plate 31A and the limit switch 30A are in contact with each other (i.e. a point at which the limit switch 30A is actuated by the contact) is an origin point MPo of the first exemplary embodiment.

Similarly, when the movement block 31 is retracted to a base side (i.e. an end opposite to the stylus 37) to reach the movement limit, the limit plate 31B is in contact with the limit switch 30B to stop the drive mechanism 39, at which a terminal point MPx of the first exemplary embodiment is defined.

As described above, the movement of the movement block 31 is effected in a movable range Rm from the origin point MPo to the terminal point MPx. Consequently, the movement of the stylus 37 supported by the movement block 31 is effected in the movable range Rm from the origin point MPo to the terminal point MPx.

The measurement operation on the workpiece 4 is effected within a measurement range Rd from a start point WPs to an end point WPe that is set in the movable range Rm. The length of the measurement range Rd is equal to or shorter than the movable range Rm of the stylus 37.

Next, a process for measuring a surface texture using the surface texture measuring machine 1 according to the first exemplary embodiment will be described below with reference to FIGS. 4 to 7.

When the surface texture measuring machine 1 shown in FIG. 1 is actuated, a system is started by the controller 24 and a screen is displayed on the display 21 after self-checking various components, where the surface texture measuring machine 1 is set at a standby state waiting for operation commands on the console 22.

Figure 4:
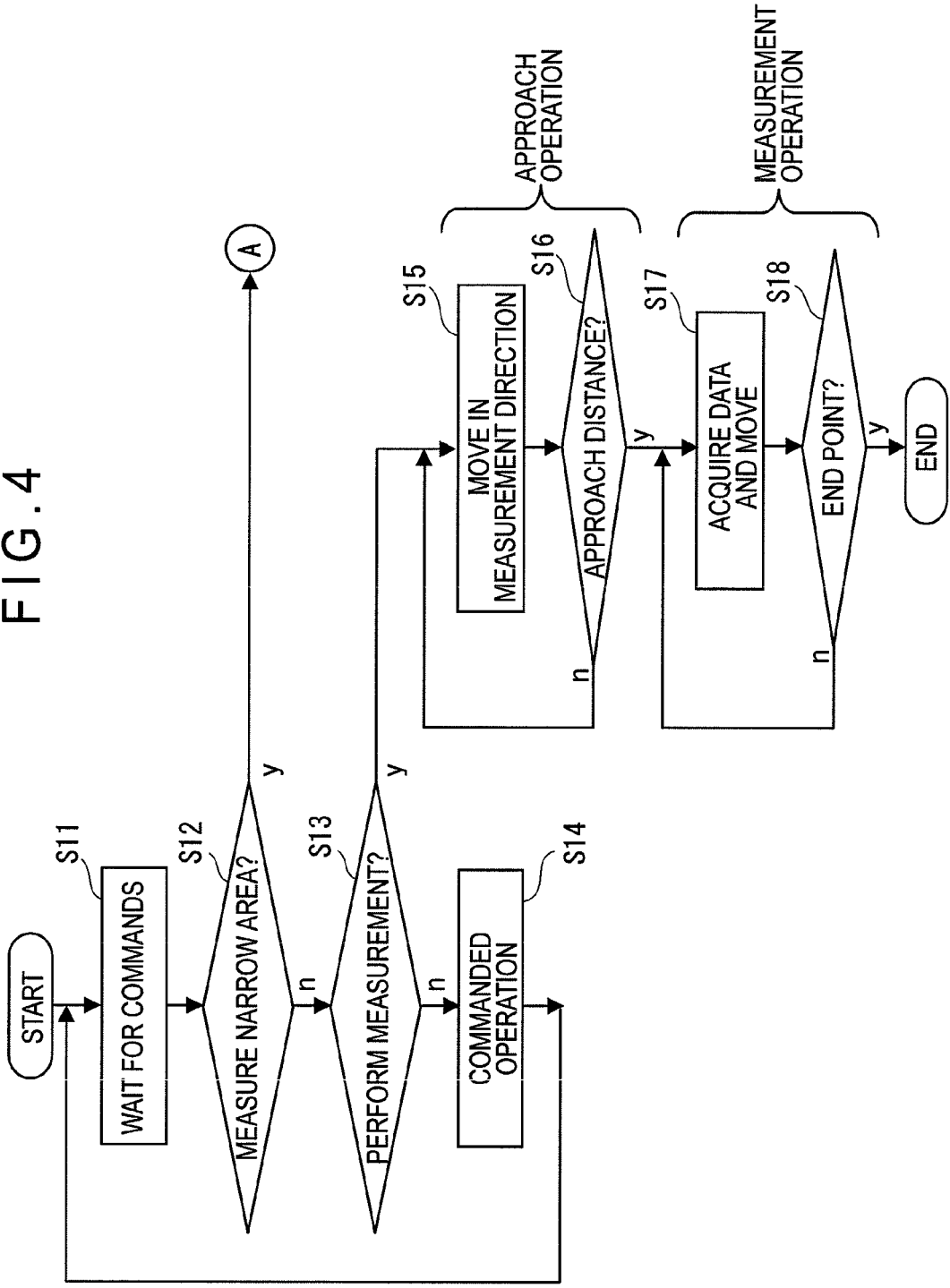
FIG. 4 is a flowchart showing an operation in a normal measurement mode according to the first exemplary embodiment.

As shown in FIG. 4, when the console 22 is operated while waiting for operation commands (Step S11), the controller 24 checks content of the commands (Steps S12 to S13).

When the operation content is "selection of narrow-area measurement mode", the process jumps to a later-described "narrow-area measurement mode" at a branch A (Step S12).

When the operation content is "execution of measurement", a series of processes (Steps S15 to S18) in a later-described "normal measurement mode" is performed (Step S13).

When an operation other than the above is commanded, the controller 24 performs the commanded operation (Step S14). Specific examples of the other commands are manual movement of the stylus 37, other mechanical operations, data aggregation, switching display content and transition to a setting mode.

When the operation content is "execution of measurement" in the above Step S13, the process in the "normal measurement mode" is performed.

The normal measurement mode corresponds to an operation of the conventional surface texture measurement, where, as shown in FIG. 3, the stylus 37 is brought into contact with the workpiece 4 and is moved along the surface of the workpiece 4 to detect the displacement of the stylus 37 during the movement.

At this time, an approach operation is conducted prior to the measurement operation in the first exemplary embodiment.

As shown in FIG. 4, the stylus 37 is moved in a designated measurement direction in the normal measurement mode (Step S15). When the stylus 37 is moved for a predetermined approach distance (Step S16), the movement of the stylus 37 is continued after being switched to another mode accompanying the data acquisition from the detector 38 (Step S17). When the stylus 37 reaches the end point (Step S18), the operation is terminated. Among the above steps, Steps S15 and S16 correspond to the approach operation and Steps S17 and S18 correspond to the measurement operation.

Figure 5:
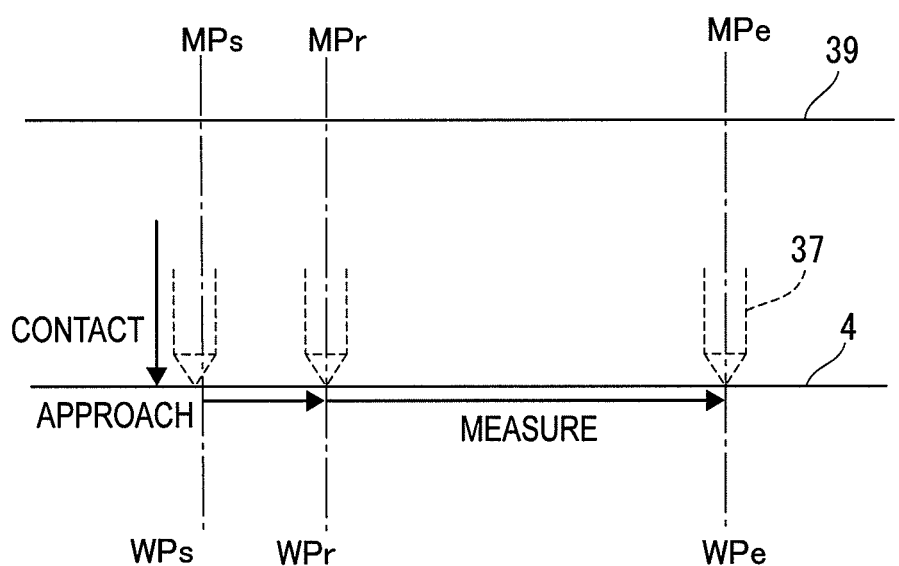
FIG. 5 schematically illustrates the operation in the normal measurement mode according to the first exemplary embodiment.

As shown in FIG. 5, the stylus 37 is in contact with the workpiece 4 at a start point MPs on the drive mechanism 39, which corresponds to the start point WPs on the workpiece 4. The controller 24 starts the approach operation in Step S15 and, when the stylus 37 reaches predetermined operation switching points MPr and WPr, the controller 24 switches the operation to the measurement operation in Step S16. When the stylus 37 reaches end points MPe and WPe while acquiring the data, the movement of the stylus 37 is stopped. Accordingly, the surface texture data of the workpiece 4 from the operation switching point WPr to the end point WPe can be acquired.

It should be noted that the respective points WPs, WPr and WPe on the workpiece 4 are detected as the respective points MPs, MPr and MPe of the drive mechanism 39. These relationships have been determined when the stylus 37 is brought into contact with the workpiece 4.

Figure 6:
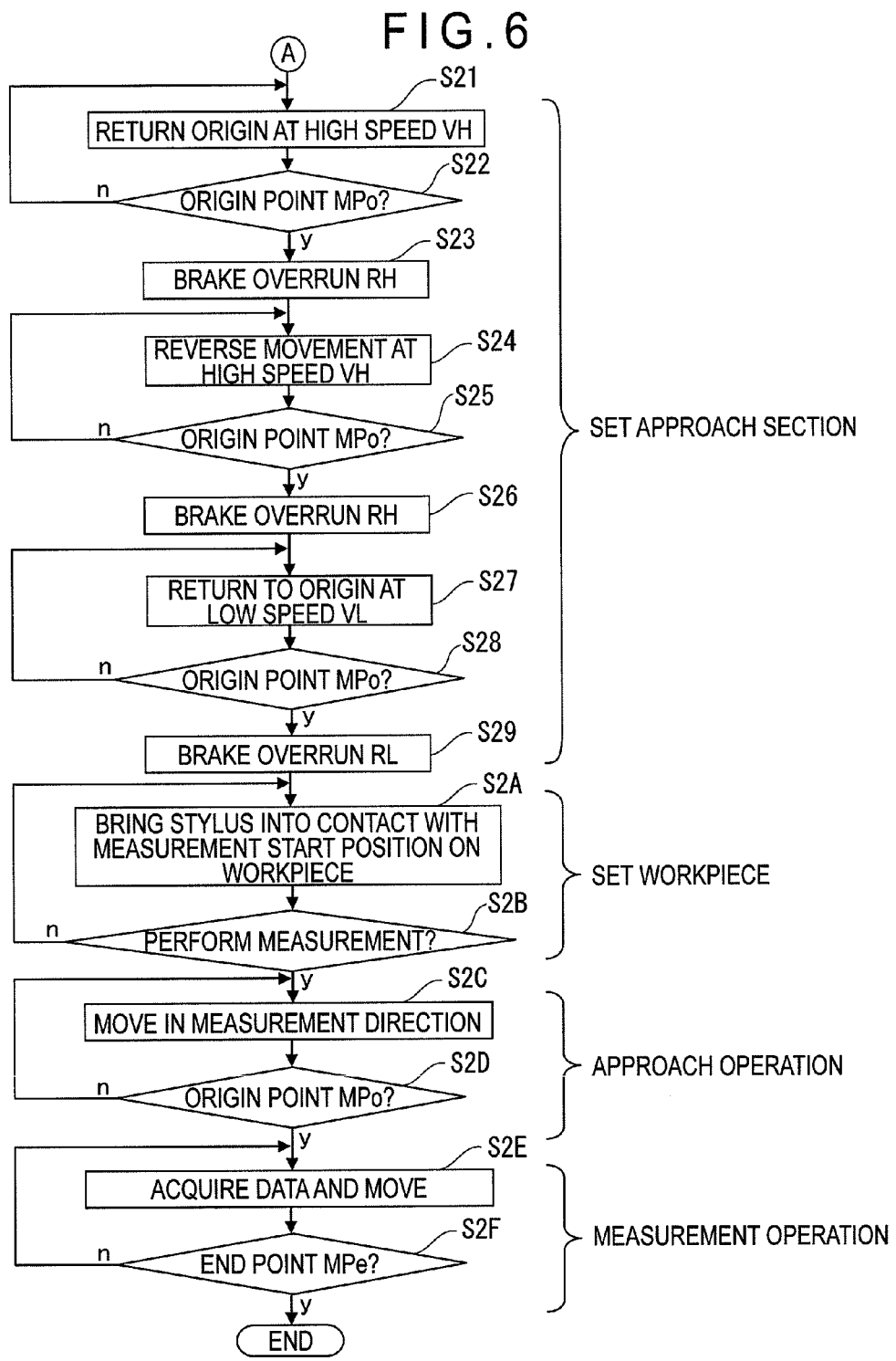
FIG. 6 is a flowchart showing an operation in a narrow-area measurement mode according to the first exemplary embodiment.

When the operation content is the "narrow-area measurement mode" in the above Step S12, the process in the "narrow-area measurement mode" shown in FIG. 6 is performed.

As shown in FIG. 6, in the narrow-area measurement mode, an approach section setting (Steps S21 to S29) is initially performed to set the approach section corresponding to an overrun, and a workpiece setting (Steps S2A to S2B) is subsequently performed. After these preparation steps, the approach operation (Steps S2C to S2D) and the measurement operation (Steps S2E to S2F) are performed.

In the approach section setting operation, the following three origin return operations are repeated.

Figure 7:
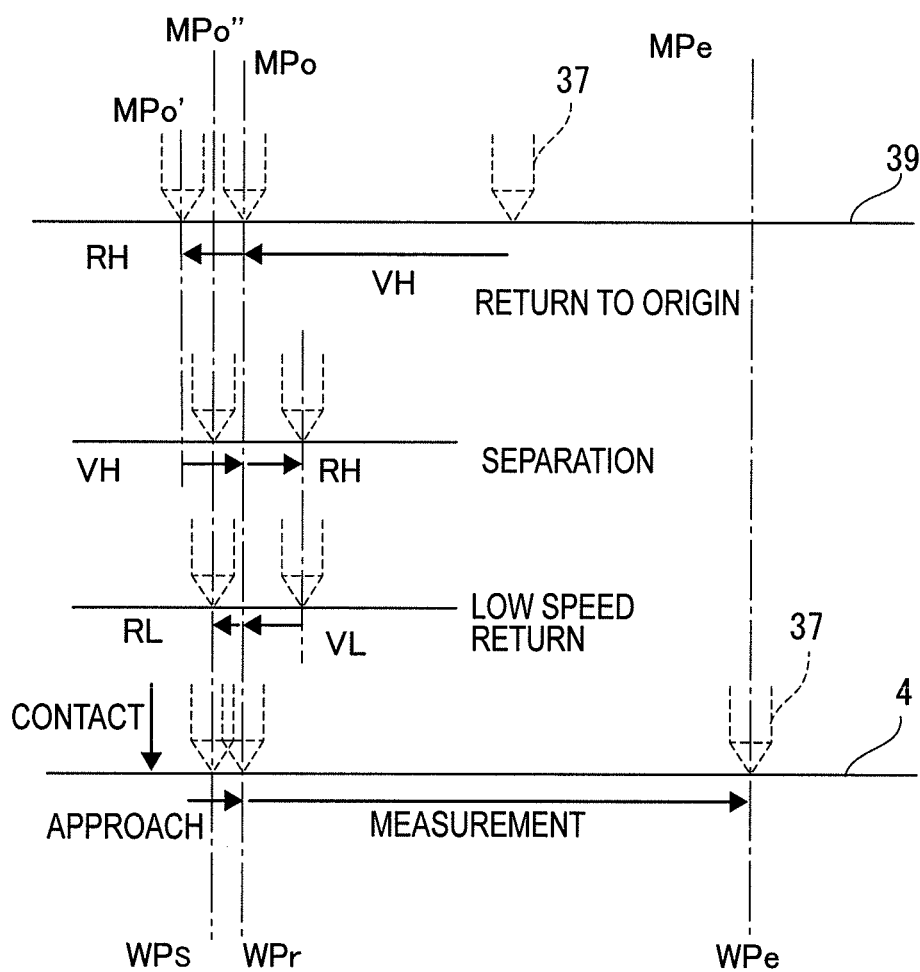
FIG. 7 schematically illustrates the operation in the narrow-area measurement mode according to the first exemplary embodiment.

In FIG. 7, the three origin return operations are represented as "origin return", "separation" and "low-speed return."

In the first origin return operation (Steps S21 to S23) in FIG. 6, the stylus 37 is returned to the origin at a high speed (Step S21). The controller 24 monitors an output of the limit switch 30A (see FIG. 3) while the stylus 37 is moved to the origin point MPo (Step S22). When the stylus 37 reaches the origin point MPo, the controller 24 brakes the drive mechanism 39. The stylus 37 and the movement block 31 are to immediately stop at the origin point MPo, however, due to the inertia of themselves, the stylus 37 and the movement block 31 slightly overrun the origin point MPo before being stopped (Step S23).

In the first origin return shown in FIG. 7, the stylus 37 may be located at any position within the movable range Rm (see FIG. 3) and starts moving toward the origin point MPo from the current position.

A movement speed in the first origin return is a relatively high first speed VH. The first speed VH may be determined in accordance with a coarse movement speed of the stylus 37 of the drive mechanism 39.

In Step S21, the stylus 37 moves toward the origin point MPo at the high first speed VH, and, when it is detected that the stylus 37 has reached the origin point MPo in Step S22, the stylus 37 is braked in Step S23 and overruns the origin point MPo before being stopped. A distance between a stop point MPo' at this time and the origin point MPo is an overrun RH.

The first origin return operation (origin return in FIG. 7) is completed as described above.

In the second origin return operation (Steps S24 to S26) in FIG. 6, the stylus 37 is returned to the origin at a high speed in a direction reverse to that in the first origin return operation (Step S24). The controller 24 monitors the output of the limit switch 30A (see FIG. 3) while the stylus 37 is moved to the origin point MPo (Step S25). When the stylus 37 reaches the origin point MPo, the controller 24 brakes the drive mechanism 39. The stylus 37 and the movement block 31 are to immediately stop at the origin point MPo, however, due to the inertia of themselves, the stylus 37 and the movement block 31 slightly overrun the origin point MPo before being stopped (Step S26).

As shown in FIG. 7, the stylus 37 stops at the stop point MPo' overrunning the origin point MPo by the overrun RH as a result of the first origin return operation.

In Step S24, the stylus 37 moves toward the origin point MPo at the high first speed VH equal to that in the first origin return, and, when it is detected that the stylus 37 has reached the origin point MPo in Step S25, the stylus 37 is braked in Step S26 and overruns the origin point MPo before being stopped. Due to the overrun (the overrun RH), the stylus 37 returns again into the movable range Rm (see FIG. 3) beyond the origin point MPo.

It should be noted that the second origin return may alternatively be performed at a low second speed VL (described later) resulting in an overrun RL.

The second origin return operation ("separation" in FIG. 7) is completed as described above.

In the third origin return operation (Steps S27 to S29) in FIG. 6, the stylus 37 is returned to the origin at a low speed in the same direction as that in the first origin return operation (Step S27). The controller 24 monitors the output of the limit switch 30A (see FIG. 3) while the stylus 37 is moved to the origin point MPo (Step S28). When the stylus 37 reaches the origin point MPo, the controller 24 brakes the drive mechanism 39. The stylus 37 and the movement block 31 are to immediately stop at the origin point MPo, however, due to the inertia of themselves, the stylus 37 and the movement block 31 slightly overrun the origin point MPo before being stopped (Step S29).

As shown in FIG. 7, the stylus 37 stops at the stop point MPo' overrunning the origin point MPo by the overrun RH as a result of the second origin return operation.

In Step S27, the stylus 37 moves toward the origin point MPo at the second speed VL lower than the first speed VH, and, when it is detected that the stylus 37 has reached the origin point MPo in Step S28, the stylus 37 is braked in Step S29 and overruns the origin point MPo before being stopped. A distance between a stop point MPo" at this time and the origin point MPo is an overrun RL. The overrun RL is sufficiently smaller than the overrun RH resulting from the first speed VH.

The third origin return operation ("low-speed return" in FIG. 7) is completed as described above.

The approach section is set by the above three origin return operations. As a result of the third origin return operation, the stylus 37 stops at the stop point MPo". The approach section is set as the distance between the stop point MPo" and the origin point MPo (i.e. the overrun RL).

In the workpiece setting operation in FIG. 6, the start point WPs of the measurement range of the workpiece 4 is aligned with the stylus 37 that is stopped at the stop point MPo" and the stylus 37 is brought into contact with the workpiece 4 (Step S2A).

Subsequently, when the console 22 is operated to command to start the measurement (Step S2B), the controller 24 commands the drive mechanism 39 to perform the approach operation (Steps S2C to S2D) and the measurement operation (Steps S2E to S2F).

Specifically, the stylus 37 is moved in the designated measurement direction (Step S2C). When the stylus 37 reaches the origin point MPo (Step S2D), the movement of the stylus 37 is continued after being switched to another mode accompanying the data acquisition from the detector 38 (Step S2E). When the stylus 37 reaches the end point MPe (Step S2F), the operation is terminated.

As shown in FIG. 7, the stylus 37 is in contact with the workpiece 4 while being stopped at the stop point MPo" on the drive mechanism 39 in Step S2A, which corresponds to the start point WPs on the workpiece 4. The controller 24 starts the approach operation in Step S2C and, when the stylus 37 reaches the origin point MPo on the drive mechanism 39, the controller 24 switches the operation to the measurement operation in Step S2D. The position is the operation switching point WPr on the workpiece 4. Further, the movement of the stylus 37 is continued while acquiring the data in Step S2E, and, when the stylus 37 reaches the end point WPe (end point MPe on the drive mechanism 39), the movement of the stylus 37 is stopped. Accordingly, the surface texture data of the workpiece 4 from the operation switching point WPr to the end point WPe can be acquired.

Incidentally, the end point MPe on the drive mechanism 39 can be calculated by adding the distance from the start point WPs to the end point WPe on the workpiece 4 to the coordinate of the stop point MPo".

As described above, in the narrow-area measurement mode according to this exemplary embodiment, the backlash of the stylus 37 and the drive mechanism 39 is compiled on one side in the approach section for the overrun RL that is set by the approach section setting operation. The movement from the approach section is continued in the subsequent measurement operation, so that the influence of the backlash can be eliminated.

In the narrow-area measurement mode of the first exemplary embodiment, since the approach section is set with the use of the overrun after passing the origin during the origin return operation in the approach section setting operation, the distance of the approach section (overrun RL) can be set small.

In this exemplary embodiment, when the high first speed is approximately 2 mm/sec, the overrun RH is 70 μm. When the low second speed is 0.5 mm/sec, the overrun RL is approximately 7 μm. In this exemplary embodiment, the overrun RL is approximately 7 μm at the 0.5 mm/sec (the second speed), so that the approach section can be considerably reduced as compared with conventional distance of approximately 0.5 mm.

For instance, when a bottom section of a groove of 1 mm in width is to be measured, the distance conventionally available for the measurement is 0.5 mm (50% of the total width). In contrast, the distance available for the measurement is 0.993 mm with the overrun RL=7 μm, where substantially the entire width is available for the measurement.

The narrow-area measurement mode can be set with a simple operation, i.e. selecting the narrow-area measurement mode on the surface texture measuring machine, setting the workpiece and commanding the measurement operation. Further, as described above, the surface texture measuring machine of this exemplary embodiment can perform the conventional measurement operation when the normal measurement mode is selected.

In the first exemplary embodiment, the three origin return operations are repeated as the approach section setting operation.

At this time, since the stylus 37 is moved at the high first speed VH in the first origin return operation, the operation time can be reduced.

In addition, the second origin return operation is reversely performed, so that the first and the last (third) origin return operations can be directed in the same direction.

In addition, since the last origin return operation is conducted at the low second speed VL, the overrun RL can be shortened, thereby reducing the approach section and ensuring longer distance for the measurement operation.

In the first exemplary embodiment, the operations can be switched by detecting that the stylus 37 passes over the origin point MPo in any of the three origin return operations. Thus, it is not necessary to set a predetermined point for decelerating or suspending the stylus 37 before reaching the origin point MPo, and to provide a position sensor to constantly monitor the movement position of the stylus 37 during the control of the movement of the stylus 37.

Accordingly, though as many as three operation switching are necessary, the structure and control of the machine can be simplified, so that the facility cost can be reduced and serviceability can be enhanced.

Second Exemplary Embodiment

Figure 8:
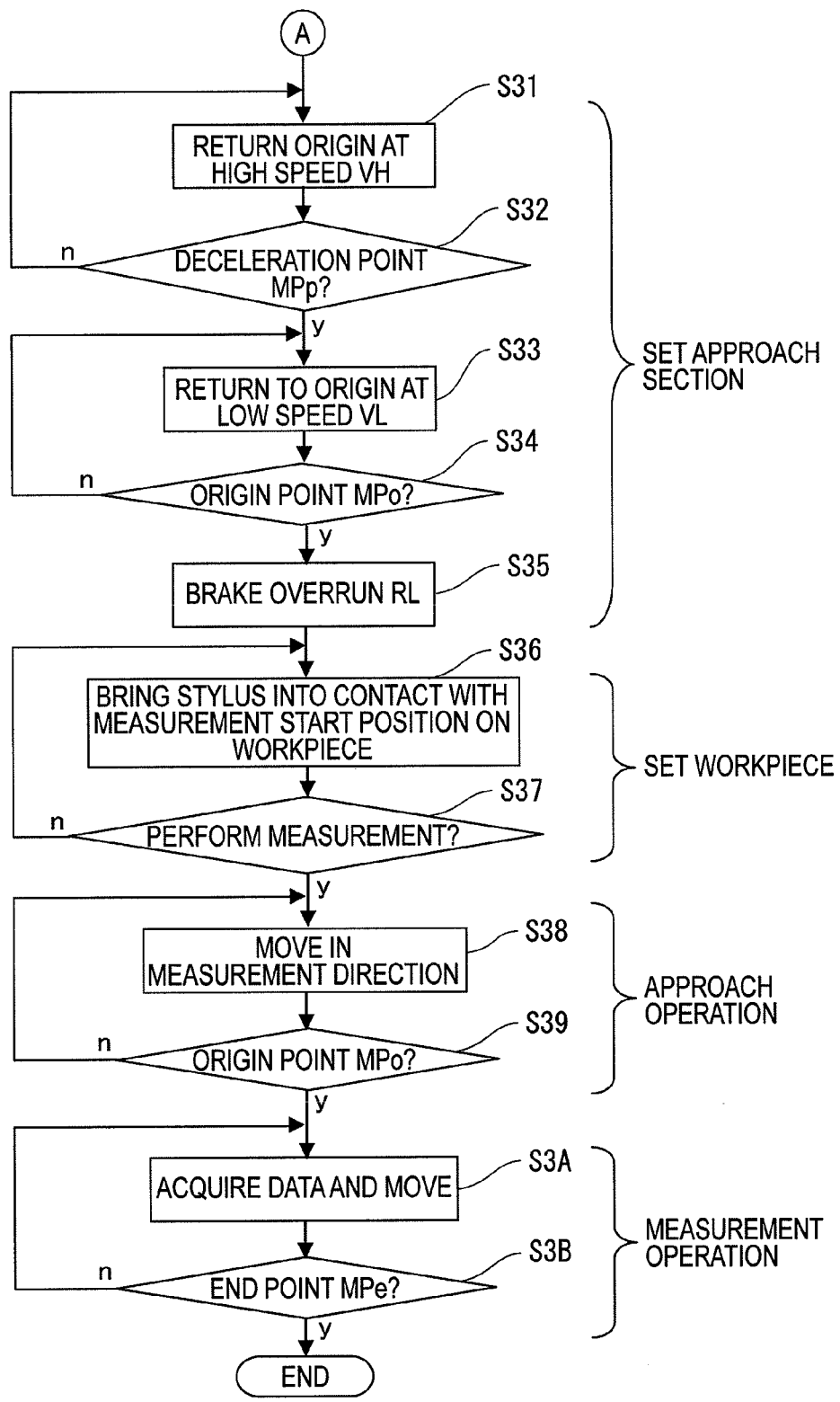
FIG. 8 is a flowchart showing an operation in the narrow-area measurement mode according to a second exemplary embodiment of the invention.
Figure 9:
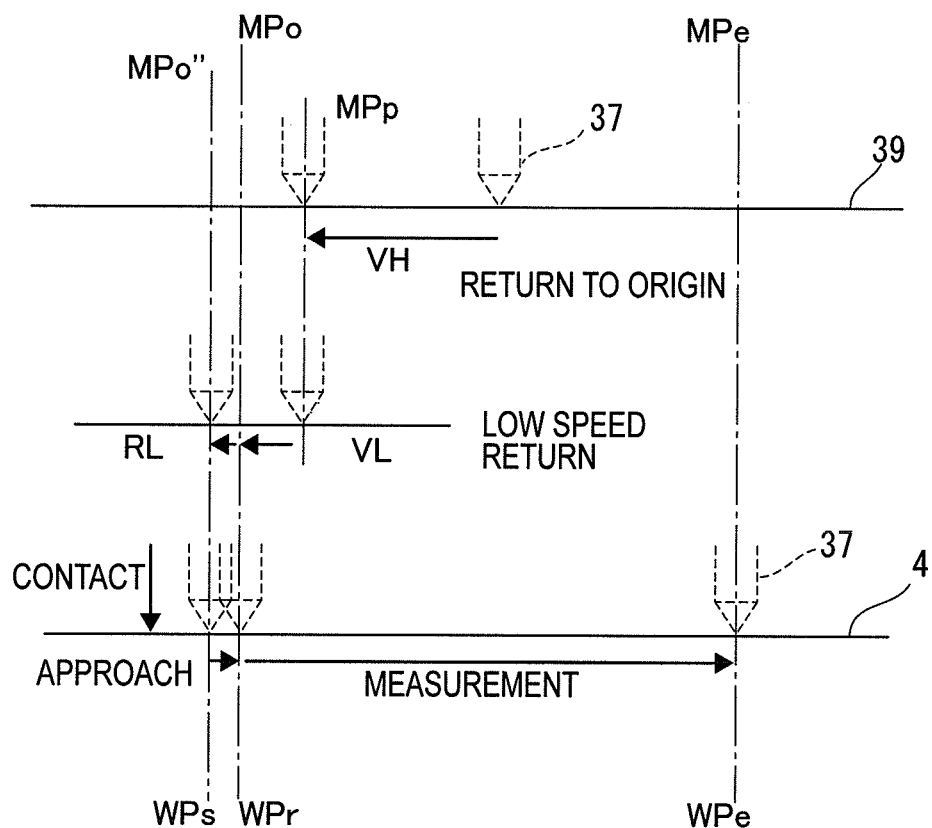
FIG. 9 schematically illustrates the operation in the narrow-area measurement mode according to the second exemplary embodiment.

FIGS. 8 and 9 show a second exemplary embodiment of the invention.

The machine used in the second exemplary embodiment is the same as the above-described first exemplary embodiment (see FIGS. 1 to 3) and basic operations thereof (see FIGS. 4 and 5) are also the same. The second exemplary embodiment differs from the above-described first exemplary embodiment in the details of the "narrow-area measurement mode" branched off from the branch A in Step S12 in FIG. 4. Accordingly, for the purpose of simplification, the common description will be omitted and the "narrow-area measurement mode" different from that in the first exemplary embodiment will be described below.

As shown in FIG. 8, in the narrow-area measurement mode of the second exemplary embodiment, an approach section setting (Steps S31 to S35) is initially performed to set the approach section corresponding to an overrun, and a workpiece setting (Steps S36 to S37) is subsequently performed. After these preparation steps, the approach operation (Steps S38 to S39) and the measurement operation (Steps S3A to S3B) are performed.

Among the above operations, the steps including and after the workpiece setting (Steps S36 to S3B) are the same as the respective steps in the above described first exemplary embodiment (Steps S2A to S2F). What is different is the setting of the approach section (Steps S31 to S35).

In the approach section setting operation in the second exemplary embodiment, a deceleration point MPp is set in advance before reaching the origin point MPo and the origin return speed is switched from a high speed to a low speed at the deceleration point MPp.

In FIG. 9, the high-speed and low-speed movements that are switched at the deceleration point MPp are represented as "return to origin" and "low-speed return."

In the high-speed origin return operation (Steps S31 to S32) in FIG. 8, the controller 24 actuates the drive mechanism 39 and moves the stylus 37 toward the origin at a high speed (Step S31). The controller 24 monitors the current position of the drive mechanism 39 (Step S32). When the stylus 37 reaches the deceleration point MPp that is set before reaching the origin point MPo, the controller 24 switches the speed of the drive mechanism 39 to a low speed and continues the movement of the stylus 37 (Step S33).

While the stylus 37 continues the movement toward the origin point MPo, the controller 24 monitors the output of the limit switch 30A (see FIG. 3) (Step S34). When the stylus 37 reaches the origin point MPo, the controller 24 brakes the drive mechanism 39 (Step S35). The stylus 37 and the movement block 31 are to immediately stop at the origin point MPo, however, due to the inertia of themselves, the stylus 37 and the movement block 31 slightly overrun the origin point MPo before being stopped.

In the origin return operation shown in FIG. 9, the stylus 37 may be located at any position within the movable range Rm (see FIG. 3) and starts moving toward the origin point MPo from the current position.

A movement speed in starting the origin return is a relatively high first speed VH. The first speed VH may be determined in accordance with a coarse movement speed of the stylus 37 of the drive mechanism 39.

In Step S31, the stylus 37 moves toward the origin point MPo at the high first speed VH, and, when it is detected that the stylus 37 has reached the deceleration point MPp in Step S32, the movement speed is switched to the second speed VL that is lower than the first speed VH in Step S33. Then, the movement of the stylus 37 at the second speed VL is continued in Step S34 and, when it is detected that the stylus 37 has reached the origin point MPo, the stylus 37 is braked in Step S35 and overruns the origin point MPo before being stopped. A distance between a stop point MPo" at this time and the origin point MPo is the overrun RL. The overrun RL is sufficiently smaller than the overrun RH resulting from the first speed VH.

As a result of the approach section setting, the stylus 37 has stopped at the stop point MPo". The approach section is set as the distance between the stop point MPo" and the origin point MPo (i.e. the overrun RL).

In the workpiece setting operation in FIG. 8, the start point WPs of the measurement range of the workpiece 4 is aligned with the stylus 37 that is stopped at the stop point MPo" and the stylus 37 is brought into contact with the workpiece 4 (Step S36).

Subsequently, when the console 22 is operated to command to start the measurement (Step S37), the controller 24 commands the drive mechanism 39 to perform the approach operation (Steps S38 to S39) and the measurement operation (Steps S3A to S3B).

Specifically, the stylus 37 is moved in the designated measurement direction (Step S38). When the stylus 37 reaches the origin point MPo (Step S39), the movement of the stylus 37 is continued after being switched to another mode accompanying the data acquisition from the detector 38 (Step S3A). When the stylus 37 reaches the end point MPe (Step S3B), the operation is terminated.

As shown in FIG. 9, the stylus 37 is in contact with the workpiece 4 at the stop point MPo" on the drive mechanism 39 in Step S36, which corresponds to the start point WPs on the workpiece 4. The controller 24 starts the approach operation in Step S38 and, when the stylus 37 reaches the origin point MPo on the drive mechanism 39, the controller 24 switches the operation to the measurement operation in Step S39. The position is the operation switching point WPr on the workpiece 4. Further, the movement of the stylus 37 is continued while acquiring the data in Step S3A, and, when the stylus 37 reaches the end point WPe (end point MPe on the drive mechanism 39) in Step S3B, the movement of the stylus 37 is stopped. Accordingly, the surface texture data of the workpiece 4 from the operation switching point WPr to the end point WPe can be acquired.

Incidentally, the end point MPe on the drive mechanism 39 can be calculated by adding the distance from the start point WPs to the end point WPe on the workpiece 4 to the coordinate of the stop point MPo".

The second exemplary embodiment also offers the same advantages as those in the first exemplary embodiment by the narrow-area measurement mode such as the elimination of the influence of the backlash by the presence of the approach operation, reduction of the distance of the approach section (overrun RL), increase in the distance available for the measurement and simplification of the operation.

Further, unlike the first exemplary embodiment, since the movement speed is switched to the low second speed VL at the deceleration point MPp before reaching the origin point after moving at the high first speed VH in the second exemplary embodiment, waste of time can be eliminated while ensuring the short overrun RL in the approach section.

Specifically, in the approach section setting operation according to the second exemplary embodiment, since the preceding high-speed movement (Steps S31 to S32) is switched to the low-speed movement (Steps S33 to S34) without accompanying direction switching, the original movement direction at the start of the movement toward the origin point is continued until the stylus 37 overruns the origin point. Thus, complicated operations for reversing the direction and the like are not necessary and the movement can be efficiently conducted.

Incidentally, the deceleration point MPp, i.e. the predetermined point at which the first speed is switched to the second speed, is preferably adjusted based on the relationship between the operation speeds, i.e. the first speed VH and the second speed VL, and the like. When the deceleration point MPp is remote from the origin point MPo, the low-speed movement has to be performed for a long time, thereby increasing the operation time. On the other hand, when the deceleration point MPp is excessively close to the origin point MPo, the stylus 37 is not sufficiently decelerated to the low speed until the stylus 37 passes the origin point MPo, so that the overrun RL, i.e. the approach section, cannot be sufficiently shortened. Thus, it is preferable that an appropriate value is set in view of the above conditions.

Further, when the first speed VH is switched to the second speed VL, the speed of the stylus 37 may be simply decelerated after passing the deceleration point MPp before reaching the origin point MPo, or, alternatively, the stylus 37 may be stopped at the deceleration point MPp and moved again at the second speed VL.

In order to detect the deceleration point MPp that is set at the predetermined position before reaching the origin point, a position sensor disposed along the movement path to detect that the stylus 37 has reached the predetermined position, or a current-position counter provided to the drive mechanism 39 and the controller 24 that is monitored to detect that the stylus 37 has reached the deceleration point MPp or the like suitable mechanism may be used.

Third Exemplary Embodiment

Figure 10:
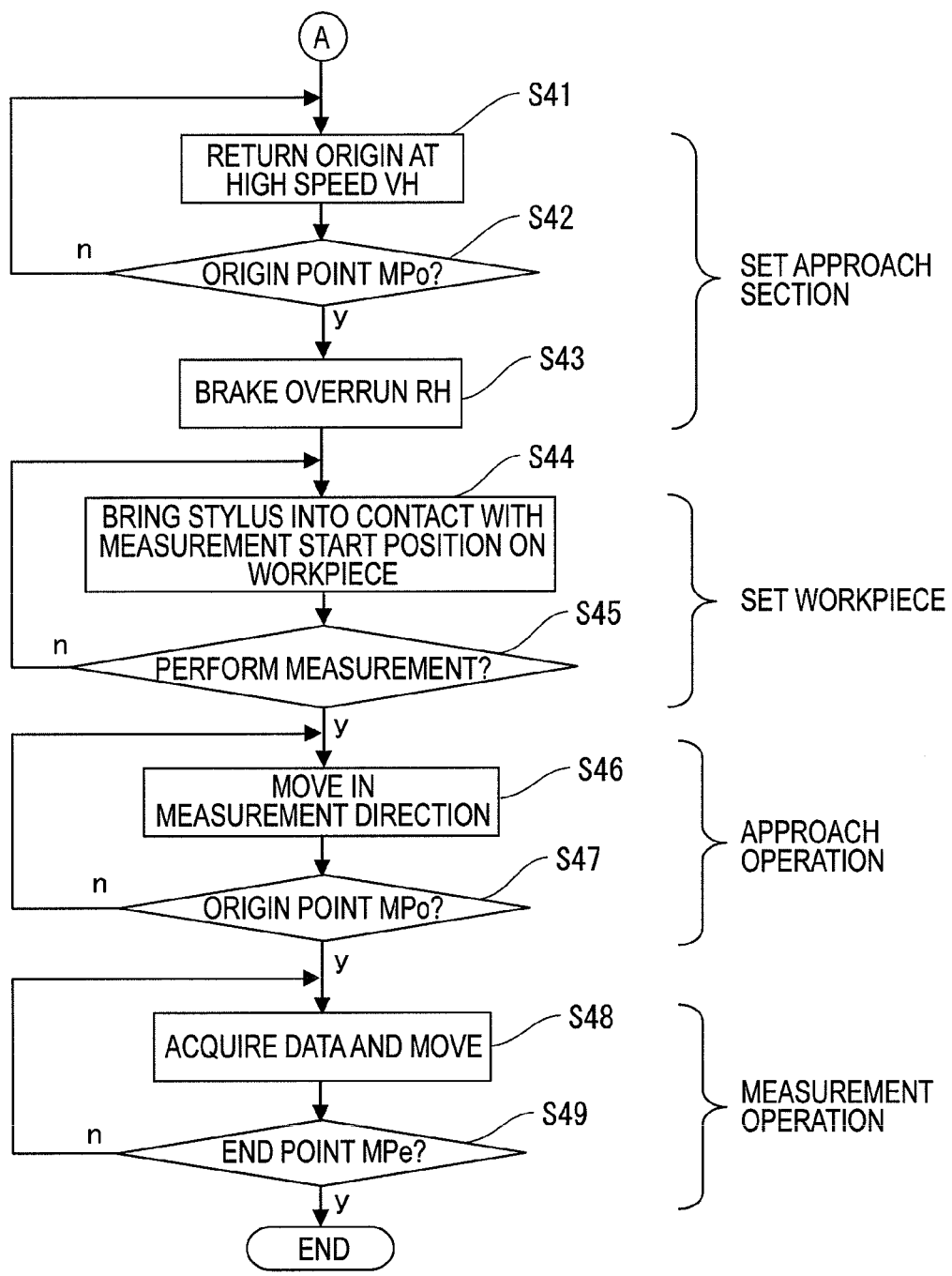
FIG. 10 is a flowchart showing an operation in the narrow-area measurement mode according to the third exemplary embodiment.
Figure 11:
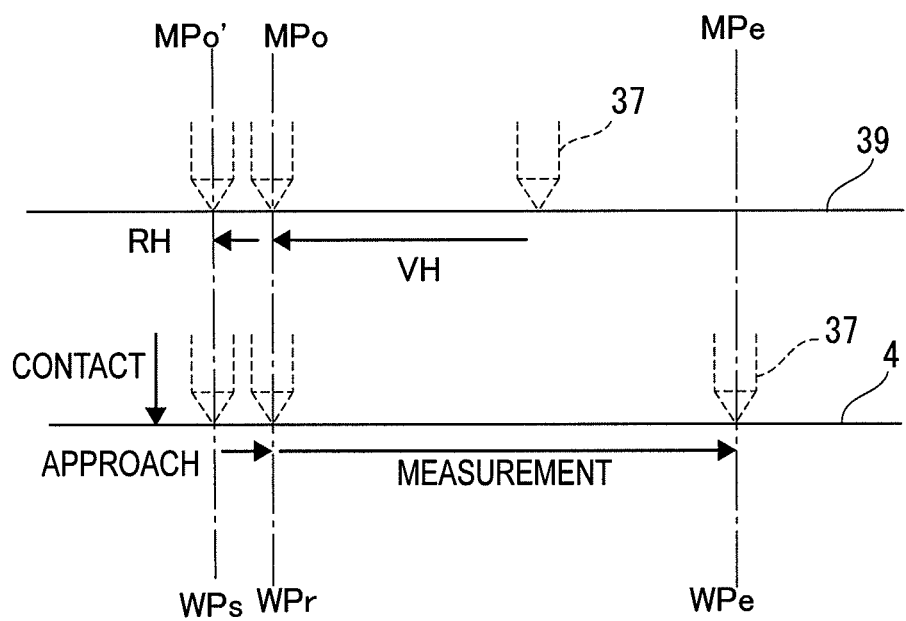
FIG. 11 schematically illustrates the operation in the narrow-area measurement mode according to the third exemplary embodiment.

FIGS. 10 and 11 show a third exemplary embodiment of the invention.

The machine used in the third exemplary embodiment is the same as the above-described first exemplary embodiment (see FIGS. 1 to 3) and basic operations thereof (see FIGS. 4 and 5) are also the same. The third exemplary embodiment differs from the above-described first exemplary embodiment in the details of the "narrow-area measurement mode" branched off from the branch A in Step S12 in FIG. 4. Accordingly, for the purpose of simplification, the common description will be omitted and the "narrow-area measurement mode" different from that in the first exemplary embodiment will be described below.

As shown in FIG. 10, in the narrow-area measurement mode of the third exemplary embodiment, an approach section setting (Steps S41 to S43) is initially performed to set the approach section corresponding to an overrun, and a workpiece setting (Steps S44 to S45) is subsequently performed. After these preparation steps, the approach operation (Steps S46 to S47) and the measurement operation (Steps S48 to S49) are performed.

Among the above operations, the steps including and after the workpiece setting (Steps S44 to S49) are the same as the respective steps in the above described first exemplary embodiment (Steps S2A to S2F). What is different is the setting of the approach section (Steps S41 to S43).

The approach section setting operation in the third exemplary embodiment is simply arranged where the origin return operation is performed only once.

In the approach setting operation in FIG. 10, the controller 24 actuates the drive mechanism 39 and moves the stylus 37 toward the origin at a high speed (Step S41). The controller 24 monitors the current position of the drive mechanism 39 (Step S42). When the stylus 37 reaches the origin point MPo, the controller 24 brakes the drive mechanism 39 (Step S43). The stylus 37 and the movement block 31 are to immediately stop at the origin point MPo, however, due to the inertia of themselves, the stylus 37 and the movement block 31 slightly overrun the origin point MPo before being stopped.

In the origin return operation shown in FIG. 11, the stylus 37 may be located at any position within the movable range Rm (see FIG. 3) and starts moving toward the origin point MPo from the current position.

A movement speed in starting the origin return is a relatively high first speed VH. The first speed VH may be determined in accordance with a coarse movement speed of the stylus 37 of the drive mechanism 39.

In Step S41, the stylus 37 moves toward the origin point MPo at the high first speed VH, and, when it is detected that the stylus has reached the origin point MPo in Step S42, the stylus 37 is braked in Step S43 and overruns the origin point MPo before being stopped. A distance between a stop point MPo' at this time and the origin point MPo is an overrun RH.

As a result of the approach section setting, the stylus 37 has stopped at the stop point MPo'. The approach section is set as the distance between the stop point MPo' and the origin point MPo (i.e. the overrun RH).

In the workpiece setting operation in FIG. 10, the start point WPs of the measurement range of the workpiece 4 is aligned with the stylus 37 that is stopped at the stop point MPo' and the stylus 37 is brought into contact with the workpiece 4 (Step S44).

Subsequently, when the console 22 is operated to command to start the measurement (Step S45), the controller 24 commands the drive mechanism 39 to perform the approach operation (Steps S46 to S47) and the measurement operation (Steps S48 to S49).

Specifically, the stylus 37 is moved in the designated measurement direction (Step S46). When the stylus 37 reaches the origin point MPo (Step S47), the movement of the stylus 37 is continued after being switched to another mode accompanying the data acquisition from the detector 38 (Step S48). When the stylus 37 reaches the end point MPe (Step S49), the operation is terminated.

As shown in FIG. 11, the stylus 37 is in contact with the workpiece 4 at the stop point MPo' on the drive mechanism 39 in Step S44, which corresponds to the start point WPs on the workpiece 4. The controller 24 starts the approach operation in Step S46 and, when the stylus 37 reaches the origin point MPo on the drive mechanism 39, the controller 24 switches the operation to the measurement operation in Step S47. The position is the operation switching point WPr on the workpiece 4. Further, the movement of the stylus 37 is continued while acquiring the data in Step S48, and, when the stylus 37 reaches the end point WPe (end point MPe on the drive mechanism 39) in Step S49, the movement of the stylus 37 is stopped. Accordingly, the surface texture data of the workpiece 4 from the operation switching point WPr to the end point WPe can be acquired.

Incidentally, the end point MPe on the drive mechanism 39 can be calculated by adding the distance from the start point WPs to the end point WPe on the workpiece 4 to the coordinate of the stop point MPo'.

The third exemplary embodiment also offers the same advantages as those in the first exemplary embodiment by the narrow-area measurement mode such as the elimination of the influence of the backlash by the presence of the approach operation, reduction of the distance of the approach section, increase in the distance available for the measurement and simplification of the operation.

Incidentally, since the movement speed immediately before stopping while setting the approach section is the first speed VH that is higher than the second speed VL immediately before stopping in the first exemplary embodiment, the overrun RH that defines the approach section becomes larger than the overrun RL in the first exemplary embodiment.

However, when the second speed VL (origin-return speed) is 2 mm/sec, the overrun is approximately 70 μm, so that the approach section can be considerably reduced as compared with conventional distance of approximately 0.5 mm.

As a result, when a bottom section of a 1-mm-width groove is to be measured, while the distance conventionally available for the measurement is 0.5 mm (50% of the total width), the distance available for the measurement is 0.93 mm with the overrun of 70 μm, so that substantially the entire width is available for the measurement.

Further, since no direction change or speed switching between a high-speed and a low-speed as mentioned in the first exemplary embodiment is necessary, extra movement and complicated operation control can be eliminated.

Further, since it is not necessary to set the deceleration point MPp for decelerating or suspending the stylus 37 before reaching the origin point MPo as in the second exemplary embodiment, a position sensor or a constant monitoring of the movement position of the stylus 37 is also not required. Thus, the structure of the machine and the processing system can be simplified.

Modifications

It should be noted that the scope of the present invention is not limited to the above-described embodiments, but includes modifications and the like as long as the modifications and the like are compatible with the invention.

For instance, the surface texture measuring machine 1 of the invention may not be constructed as described and illustrated in FIGS. 1 to 3. For instance, surface texture measuring machine 1 may be a portable machine in which the electric portion 2 and the drive/detector unit 3 are integrated, a large-size machine in which the drive/detector unit 3 is fixed on a column. In other words, the invention is applicable to a machine having a basic arrangement including the drive mechanism 39 for moving the stylus 37, the detector 38 for detecting the displacement of the stylus 37, and the controller (controller 24) for controlling the drive mechanism 39 and the detector 38.

What is claimed is:

1. A surface texture measuring machine that measures a surface texture of a workpiece by tracing a surface of the workpiece with a stylus, the surface texture measuring machine comprising:
a drive mechanism that moves the stylus in a measurement direction in a plane of the workpiece;
a detector that detects a displacement of the stylus in a direction transverse to the measurement direction; and a controller that controls the drive mechanism and the detector, wherein
the controller is operated in a normal measurement mode in which a designated range of the surface of the workpiece is measured and in a narrow-area measurement mode in which a narrow area of the workpiece is measured,
in the narrow-area measurement mode, the controller commands the drive mechanism and the detector to perform:
an approach section setting operation that is started by designating the narrow-area measurement mode, in which the stylus is moved in the measurement direction toward an origin point and, when the stylus reaches the origin point, the stylus is braked to be stopped after overrunning the origin point and is in wait for a measurement start command;
an approach operation that is started by the measurement start command, in which the stopped stylus is moved in the measurement direction reverse to the direction of the overrunning; and
a measurement operation in which the stylus continues moving in the measurement direction while acquiring data detected by the detector when the stylus passes the origin point as a result of the approach operation.

2. The surface texture measuring machine according to claim 1, wherein
in the approach section setting operation,
the stylus is moved toward the origin point at the first speed, when the stylus reaches the origin point, the stylus is braked to be stopped with the stylus overrunning the origin point,
after switching a movement direction of the stylus, the stylus is moved toward the origin point, when the stylus reaches the origin point, the stylus is braked to be stopped with the stylus overrunning the origin point,
the stylus is moved toward the origin point at a second speed lower than the first speed, and when the stylus reaches the origin point, the stylus is braked to be stopped with the stylus overrunning the origin point and is in wait for the measurement start command.

3. The surface texture measuring machine according to claim 1, wherein
in the approach section setting operation,
after the stylus is moved toward the origin point at the first speed, the stylus is decelerated when reaching a deceleration point at a predetermined distance before reaching the origin point,
the stylus is moved toward the origin point at a second speed lower than the first speed, and when the stylus reaches the origin point, the stylus is braked to be stopped with the stylus overrunning the origin point and is in wait for the measurement start command.

4. A surface texture measuring method that measures a surface texture of a workpiece by tracing a surface of the workpiece with a stylus, the surface texture measuring method comprising:

using a surface texture measuring machine comprising: a drive mechanism that moves the stylus in a measurement direction in a plane of the workpiece; a detector that detects a displacement of the stylus in a direction transverse to the measurement direction; and a controller that controls the drive mechanism and the detector;

setting an approach section, in which the stylus is moved in the measurement direction toward an origin point and, when the stylus reaches the origin point, the stylus is braked to be stopped after overrunning the origin point and is in wait for measurement start command;

bringing the stopped stylus into contact with a target portion of the workpiece;

approaching, in which the stopped stylus is moved in the measurement direction reverse to a direction of the overrunning; and continuing the movement of the stylus in the measurement direction while acquiring data detected by the detector when the stylus passes the origin point as a result of the approaching.

* * * * *